US007644312B2

(12) United States Patent
Hind et al.

(10) Patent No.: US 7,644,312 B2
(45) Date of Patent: Jan. 5, 2010

(54) VIRTUAL MACHINE MONITORING FOR APPLICATION OPERATION DIAGNOSTICS

(75) Inventors: John R. Hind, Raleigh, NC (US); Srinivasan Muralidharan, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1640 days.

(21) Appl. No.: 10/335,276

(22) Filed: Dec. 31, 2002

(65) Prior Publication Data

US 2004/0128585 A1 Jul. 1, 2004

(51) Int. Cl.
*G06F 11/00* (2006.01)
(52) U.S. Cl. ....................................... 714/38
(58) Field of Classification Search ............... 714/27, 714/38; 717/124, 127, 128
See application file for complete search history.

(56) References Cited

U.S. PATENT DOCUMENTS

| 5,367,667 | A | 11/1994 | Wahlquist et al. | 395/575 |
|---|---|---|---|---|
| 5,901,315 | A | 5/1999 | Edwards et al. | 395/704 |
| 6,119,247 | A | 9/2000 | House et al. | 714/38 |
| 6,223,202 | B1 | 4/2001 | Baych | 709/102 |
| 6,256,752 | B1 | 7/2001 | Blandy et al. | 714/38 |
| 6,357,017 | B1 * | 3/2002 | Bereiter et al. | 714/27 |
| 6,357,019 | B1 | 3/2002 | Blaisdell et al. | 714/38 |
| 6,460,070 | B1 | 10/2002 | Turek et al. | 709/202 |
| 6,721,941 | B1 * | 4/2004 | Morshed et al. | 717/127 |

OTHER PUBLICATIONS

Rich Seidner and Nick Tindall. "Interactive Debug Requirements". SIGSOFT '83: Proceedings of the symposium on High-level debugging. ACM. Mar. 1983. pp. 9-22.*
D. Savarese, *Application, Heal Thyself*, JAVAPro, <http://www.fawcette.com/javapro/2002_09/magazine/columns/proshop/default_pf.asp>, (Dec. 26, 2002).
*Java™ Debug Interface*, <http://java.sun.com/products/jpda/doc/jdi/overview-summary.html>, (Dec. 26, 2002).

* cited by examiner

*Primary Examiner*—Joshua A Lohn
(74) *Attorney, Agent, or Firm*—Joseph E. Bracken, Esq.; Steven M. Greenberg, Esq.; Carey Rodriguez Greenberg & Paul, LLP

(57) ABSTRACT

A method and system for monitoring the operation of an application in a virtual machine. The system can include a debug script processor programmed to command an application executing within the virtual machine according to instructions specified in a debug script. The system further can include a monitor component implemented according to a virtual machine debugging interface and coupled to the virtual machine. Importantly, the monitor component can have a configuration for collecting debug data produced in consequence of the application executing within the virtual machine according to the instructions specified in the debug script.

14 Claims, 3 Drawing Sheets

VIRTUAL MACHINE MONITORING FOR APPLICATION OPERATION DIAGNOSTICS

BACKGROUND OF THE INVENTION

1. Statement of the Technical Field

The present invention relates to the field of technical support for the operation of a software application, and more particularly to remotely diagnosing the operation of a software application.

2. Description of the Related Art

An important aspect of the software life-cycle can include post-release technical support. Upon the general release of a software application, typically, a support center can be established through which technical support can be provided to end users through customer service representatives (CSR) otherwise known as technical support personnel (TSP). The primary responsibility of the CSR/TSP is that of assisting the end user first in configuring the software application, and secondly in troubleshooting operational malfunctions occurring within or in consequence of the generally released software application.

While providing generic instructions for installing, configuring and troubleshooting a generally released software application can provide adequate support for many end users, as a practical matter, providing technical support to end users is a individualized experience for each end user. Accordingly, for each end user supported, the process can be personal and "hands-on". Yet, as the support of an end user often is a remote process facilitated largely through a telephone conference from many hundreds if not thousands of miles away, the CSR/TSP typically will be limited to the subjective diagnostics of the operation of the software application by the end user him or herself. Where the end user is not as familiar with the operation of the software application, the mere misdiagnosis of the operation of the software application by the end user can inhibit the proper analysis of the problem by the CSR/TSP.

Recognizing the inherent difficulties in troubleshooting the operation of a software application from afar, some have proposed the use of remote debugging agents to provide a more consistent diagnosis of the operation of an application. As an example, U.S. Pat. No. 6,119,247 to House et al. (House) relates to the remote debugging of an Internet application. In the House invention, a debug control can be embedded in a debug proxy file to establish a debug session with a development client and to transmit the application to the user computer's Web browser, so as to present data in controls disposed therein.

By comparison, in U.S. Pat. No. 6,357,019 B1 to Blaisdell et al. (Blaisdell), a method is disclosed in which network loadable debugging agents disposed in a user computer can provide information regarding the failing of an object oriented system in the user computer. Specifically, the operational problems of a networked computer can be investigated by specialized agents that are loaded onto the failing system over a network after the operational problems first appear. The agent subsequently can interact with the malfunctioning system to enable a remote user to obtain enough information to diagnose the operational problems.

Finally, U.S. Pat. No. 5,367,667 to Wahlquist et al. (Wahlquist) discloses a system for performing remote computer system diagnostic tests. In the Wahlquist system, end users can telephone a help desk representative who can create a computerized case file which includes modem telephone numbers, call and computer identification information. The representative also can select specific diagnostic tests, resident on the user's diagnostic disk, to be run on the user's computer. The representative can create a batch job which can cause the computer to connect to the user's computer via modem and can instruct the user's computer to perform the selected tests. Once the tests have completed, the user's computer can report the results to the help desk representative.

Importantly, neither House, Blaisdell nor Wahlquist can provide a non-instrusive technique for monitoring the operation of an application to diagnose operational problems. In that regard, in the House system, an intermediate development client is required to supply a debugging environment to the end user computer based upon which the operation of a Web based application in the browser of the user computer can be monitored by the intermediate development client. Without the use of the intermediate development client, the House system cannot effectively diagnose problems with the operation of the Web application.

By comparison, in Blaisdell, independent debugging agents first must be loaded in the user computer in order to aid the debugging process. Similarly, in Wahlquist, independent debugging scripts delivered on floppy diskettes will be required to undertake system diagnostics on behalf of a help desk technician. Accordingly, the long-felt problem of monitoring the operation of an application remotely in an non-intrusive manner remains an unsolved and elusive goal of the customer service and support strategy.

SUMMARY OF THE INVENTION

The present invention is a system and method for troubleshooting application operational problems remotely using a virtual machine debugging interface. By using the virtual machine debugging interface, any arbitrary program state associated with the application can be monitored without requiring the modification of the underlying application code. Rather, so long as the virtual machine is placed in a debug mode, an application monitor can exercise the application through an external commanding interface while concurrently logging application execution data through the virtual machine debugging interface. Subsequently, the logged execution data can be analyzed remotely to diagnose the operational problems of the application.

A system for monitoring the operation of an application in a virtual machine can include a debug script processor programmed to command an application executing within the virtual machine according to instructions specified in a debug script. The system further can include a monitor component implemented according to a virtual machine debugging interface and coupled to the virtual machine. Importantly, the monitor component can have a configuration for collecting debug data produced in consequence of the application executing within the virtual machine according to the instructions specified in the debug script.

Notably, the system also can include a debug script generator programmed to generate a debug script having instructions corresponding to manual commands for evoking particular state changes in the application. The manual commands can include commands selected from the group consisting of set an absolute break point, set a conditional break point, inspect an object's value, trace a method call and continue execution from a break point.

A method for diagnosing in a technical support computer the operation of an application executing in a virtual machine in a customer computer can include several steps. First, a debug script corresponding to an application execution condition described by a customer at the customer computer can be selected and forwarded by reference to the selected debug script to the customer at the customer computer. The virtual machine can be placed in debug mode.

The referenced debug script can be retrieved from a script repository and the retrieved debug script can be executed concurrently with the executing application. Finally, application execution data produced by the executing application responsive to the executed debug script can be logged and forwarded to the technical support computer. Consequently, the application execution condition can be remotely diagnosed in the technical support computer based upon the logged application data.

An execution diagnostics method for use with an application executing in a virtual machine can include placing the virtual machine in debug mode. The application can be commanded based upon instructions in a debug script. Concurrently, the virtual machine can be queried through a virtual machine debug interface to identify execution data produced by the commands. Finally, the identified execution data can be logged for use in diagnosing operational problems associated with the application.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a process and system for troubleshooting the operation of an application executing within a virtual machine. In particular, where it might be important to monitor the operation of the application so as to diagnose a particular problem, the host virtual machine can be placed into a debug mode through which a monitoring component can access the state of the application during its execution. Concurrently, a test script can be selected to exercise the target application so that the monitoring component can collect execution data which might be useful in diagnosing the nature and cause of the problem. Subsequently, the collected execution data can be posted for inspection by a technical support service.

Figure 1:
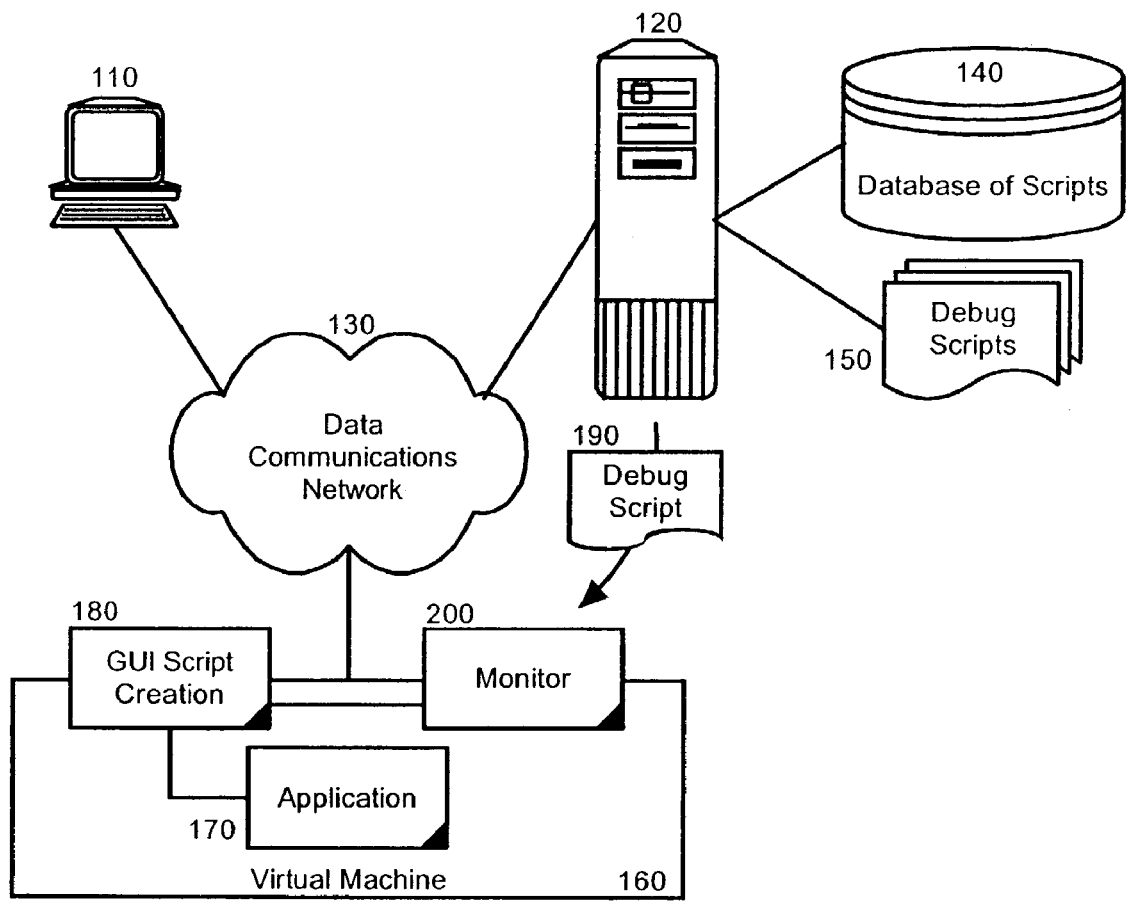
FIG. 1 is a schematic illustration of a system for monitoring the operation of an application in a virtual machine.

FIG. 1 is a schematic illustration of a system for monitoring the operation of an application in a virtual machine. The system can include a target virtual machine 160 in which the application 170 under study can operate. The target virtual machine 160 can be communicatively coupled to the technical support server 120 over the data communications network 130. Additionally, a technical support client 110 can be communicatively coupled to the technical support server 120 over the data communications network 130.

Importantly, a monitor 200 can be disposed within the target virtual machine 160 and, preferably, in association with the application 170, though the invention is not limited to a rigid association between the monitor 200 and the application 170. Rather, the monitor 200 through its disposition within the target virtual machine 160 can monitor the operation of any application operating within the target virtual machine 160. In any case, the monitor 200 further can process a debugging script 190 provided by the technical support server 120 so as to exercise the operation of the application 170 while the monitor concurrently can monitor the operation of the application 170 during the exercise defined by the process debugging script 190.

Notably, the technical support server 120 can include a database of debugging scripts 140 which can reference by way of an index, one or more pre-stored debugging scripts 150. Each of the debugging scripts 150 can be configured to exercise the application 170 so as to pinpoint a particular condition suspected of giving rise to an operational failure. To that end, each one of the debugging scripts 150 can be indexed in the database of debugging scripts 140 so that the technical support client 110 can locate a suitable one of the debugging scripts 150 responsive to the specification of a particular operational condition in the application 170.

Finally, script creation process 180 can be disposed in the virtual machine 160 to account for circumstances where a pre-constructed one of the debugging scripts 150 cannot adequately exercise the application 170 to diagnose an operational issue within the application 170. Using the script creation process 180, the application 170 can be manually commanded remotely by the technical support client 110. Additionally, the script creation process 180 can track the manually issued commands so as to produce a debugging script for future use. In this way, over time the set of debugging scripts 150 can be enhanced based upon the cumulative creation of debugging scripts in the script creation process 180.

Figure 2:
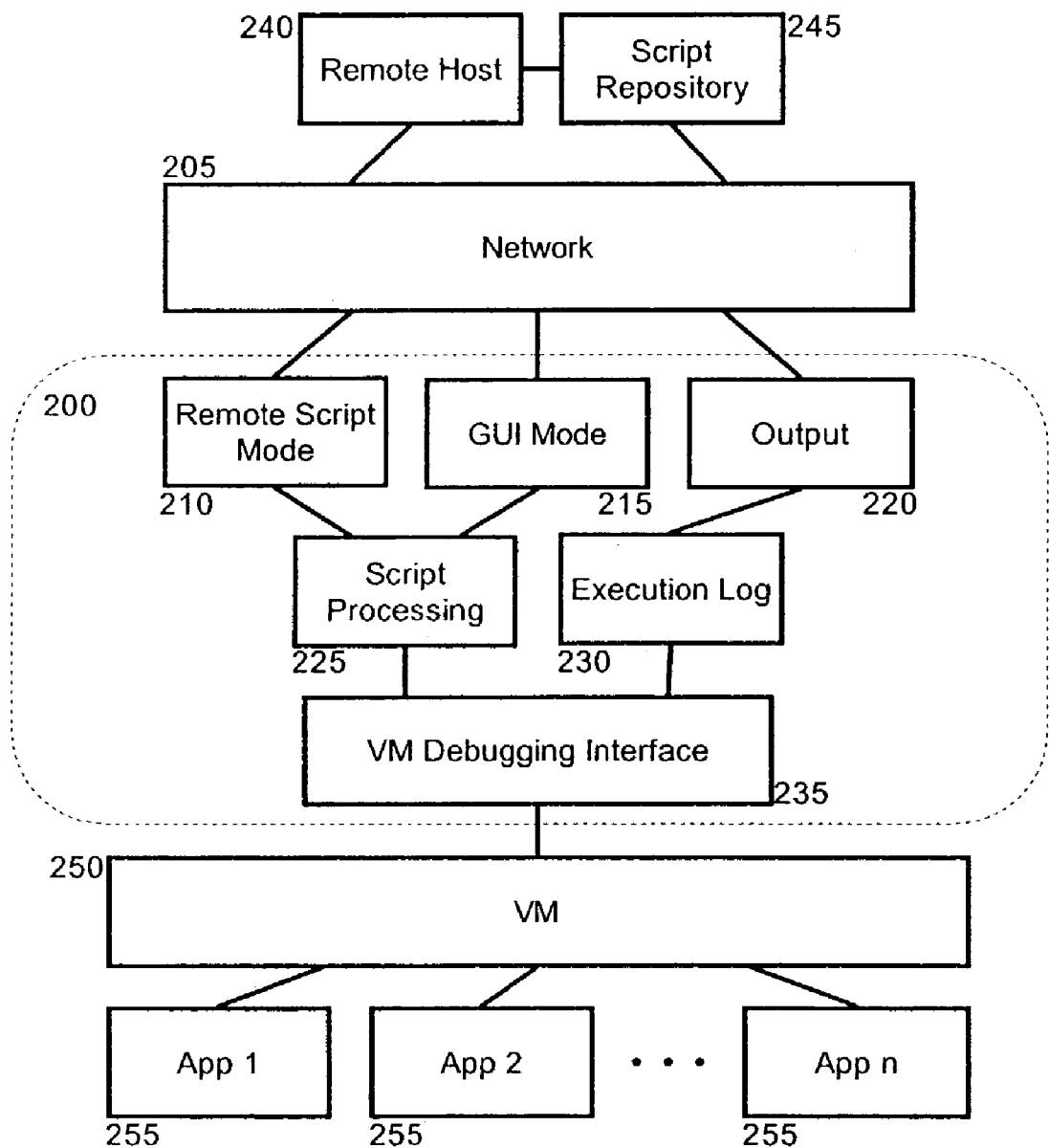
FIG. 2 is a block diagram illustrating a monitoring component configured for use in the system of FIG. 1; and, FIG. 3 is a flow chart illustrating a process for monitoring the operation of an application in a virtual machine.

FIG. 2 is a block diagram illustrating a monitoring component 200 configured for use in the system of FIG. 1. The monitoring component 200 can include a virtual machine debugging interface 235 to a virtual machine 250, for instance the Java Virtual Machine (JVM). JVM debugging interfaces are well-known in the art and can include, for instance, the Java Platform Debugger Architecture (JPDA) included in the Java 2 Standard Edition (J2SE) Software Development Kit (SDK) 1.3 distribution. JDPA, as it will be recognized by one skilled in the art, can include a JVM Debug Interface, a Java Debug Wire Protocol, and the Java Debug Interface (JDI). Using the virtual machine debugging interface 235, the monitoring component 200 can programmatically observe the operation of one or more applications 255 executing within the virtual machine 250.

The monitoring component 200 also can include both a debug script processor 225 and an execution log 230. The debug script processor 225 can parse and interpret the contents of a debug script to issue associated commands to the application 255 under study in the virtual machine 250. The execution log 230, by comparison, can include collected data associated with the operation of the application 255 under study. In this regard, the collected data stored in the execution log 230 can include, for exemplary purposes only, method calls, time delays, stack information, data values, and conditions under which certain events occur in the execution of the application 255. In consequence, an output processor 220 can post the data with in the execution log 230 to a remote entity, such as a customer service provider or a technical support server.

Notably, the monitoring component 200 can operate either in a remote script mode 210, or a GUI mode 215. In the remote script mode 210, a debug script can be provided by a remote host 240 over a data communications network 205. The debug script can be selected from among a set of a scripts in a script repository 245, though the invention is not limited to pre-specified and stored debug scripts. In this case, the scripts can specify both application commands as well as debug commands, such as stop, inspect value, trace method calls, and the like. When in remote script mode 210, the script processor 225 can process the remotely specified debug script automatically without requiring external intervention.

In the GUI mode 215, by comparison, a command script generator (not shown) can be used to prepare a debug script dynamically in response to a reported operational characteristic of an application. More particularly, when in the GUI mode 215, a shadow image of the application under study can be executed locally in a virtual machine under the control of the technical support client. The GUI can be used manually to obtain debug information which is deemed useful in order to debug the operation of the application under study in the virtual machine of the end user. The monitoring component 200 can track the manually specified commands so as to dynamically create a debug script.

In a preferred aspect of the present invention, the debug script can be a script formatted according to the extensible markup language (XML). An exemplary XML script follows:

```
<DebugScript>
    <StartMethodTrace classes="com.xyz.evtclasses*, java.awt.event.*" />
    <SetBreakPoint class="com.xyz.evtclasses.ScreenText",
    method="myPaint" />
    <Continue />
    <StopMethodTrace />
    <GetObjectValue objectname="myObject" />
    <RemoveBreakPoint="com.xyz.evtclasses.ScreenText",
    method="myPaint" />
    <StopDebug>
</DebugScript>
```

In any case, once created, the dynamically created debug script can be processed in the script processor 225 so as to exercise the application 255 under study.

Figure 3:
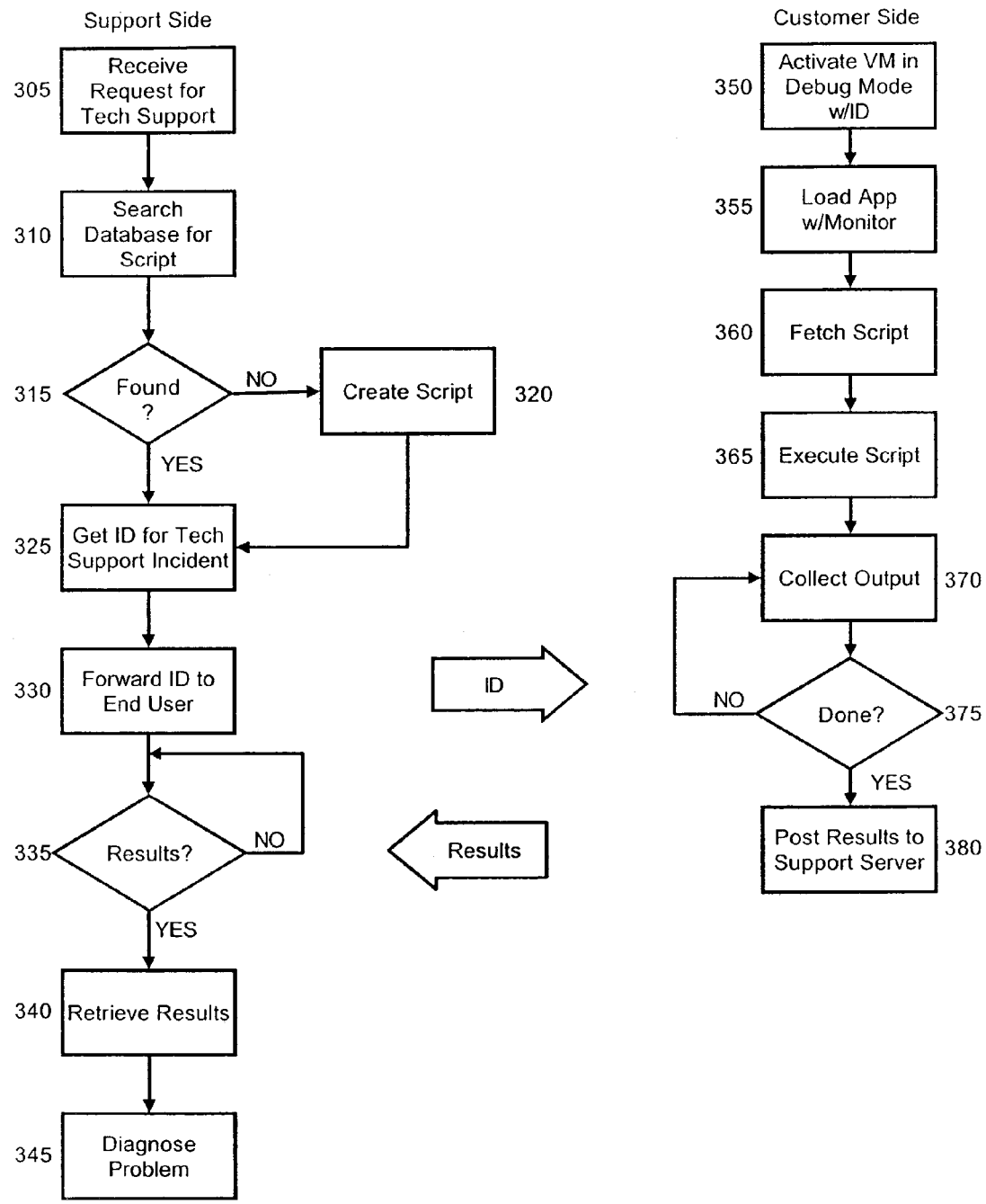

FIG. 3 is a flow chart illustrating a process for monitoring the operation of an application in a virtual machine. The process, as illustrated in FIG. 3, can be bifurcated between a support entity and a customer entity, typically positioned at different points about a computer communications network such as the global Internet. Still, the invention is not limited strictly to the bifurcation illustrated and other such configurations can be effective. In particular, the support entity can be further subdivided between a technical support representative entity and a technical support central services entity. In this arrangement, the technical support representative entity can include technical support representatives in a call center configuration. Each technical support representative can be communicatively linked to the back-end technical support central services entity in which debug scripts can be accessed.

Notwithstanding, returning now to FIG. 3, the process can begin in block 305 of the support entity when a request for technical support is received from an end user in the customer entity. In block 310, the problem experienced in the operation of an application can be described to the technical support entity who can search a database for a debug script corresponding to the described problem. In decision block 315, if a debug script cannot be located, a script can be created for the problem in block 320. In both cases, however, in block 325 a test identifier can be obtained for the specific tech support incident reported by the customer entity. Finally, in block 330, the test identifier can be forwarded to the customer entity, for example manually by telephone, or automatically by electronic mail.

Upon receiving the test identifier, in block 350 the customer entity can activate the virtual machine in a debug mode using the test identifier. In block 355, the application under study can be loaded along with its corresponding monitor component. In block 360, the monitor component can contact the technical support entity and can request a debug script based upon the test identifier. For instance, the monitor component can construct and issue a network request within a uniform resource locator (URL) using the well-known HTTP parameter, GET.

In any case, in block 365 the monitor component can execute the received debug script so as to exercise the operation of the application under study. During the course of the execution of the debug script, in blocks 370 and 375, the output produced by the execution of the application can be collected until the script has completed its execution. Subsequently, in block 380, the results of the execution of the debug script can be posted to the technical support entity, for example using the well-known HTTP parameter, POST.

Returning now to the technical support entity portion of the process, in blocks 335 and 340, the technical support entity can await the receipt of the results of the execution of the debug script. In block 340, the results can be presented to the technical support representative. Specifically, the technical support representative can be notified when the results become available, whether through instant messaging, or electronic mail, or other such electronic notification. Once notified, the technical support representative can view the results of the execution of the debug script and in block 345 the technical support representative can diagnose the reported problem based upon the posted results of the execution of the debug script.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A system for monitoring the operation of an application in a virtual machine, the system comprising:

a debug script processor programmed to command an application executing within the virtual machine according to instructions specified in a debug script; and, a monitor component implemented according to a virtual machine debugging interface and coupled to the virtual machine, said monitor component having a configuration for collecting debug data produced in consequence of said application executing within the virtual machine according to said instructions specified in said debug script.

2. The system of claim 1, further comprising a debug script generator programmed to generate a debug script comprising instructions corresponding to manual commands for evoking particular state changes in said application.

3. The system of claim 2, wherein said manual commands comprise commands selected from the group consisting of set an absolute break point, set a conditional break point, inspect an object's value, trace a method call and continue execution from a break point.

4. A method for diagnosing in a technical support computer the operation of an application executing in a virtual machine in a customer computer, the method comprising the steps of:

selecting a debug script corresponding to an application execution condition described by a customer at the customer computer, and forwarding a reference to said selected debug script to said customer at the customer computer;

placing the virtual machine in debug mode;

retrieving said referenced debug script from a script repository and executing said retrieved debug script concurrently with the executing application;

logging application execution data produced by the executing application responsive to said executed debug script; and, forwarding said logged application execution data to the technical support computer, whereby said application execution condition can be remotely diagnosed in the technical support computer based upon said logged application data.

5. An execution diagnostics method for use with an application executing in a virtual machine, the method comprising the steps of:

placing the virtual machine in debug mode;

commanding the application based upon instructions in a debug script;

querying the virtual machine through a virtual machine debug interface to identify execution data produced by said commands; and, logging said identified execution data for use in diagnosing operational problems associated with the application.

6. The method of claim 5, wherein said execution data comprises data selected from the group consisting of method calls, time delays, call stack data, and data values.

7. The method of claim 5, further comprising the step of retrieving said debug script from a remote repository of debug scripts.

8. The method of claim 7, wherein said retrieving step comprises the steps of:

specifying a test identifier to said remote repository; and, retrieving a debug script associated with said specified test identifier.

9. The method of claim 5, further comprising the step of posting said logged execution data to a remotely positioned technical support server.

10. A machine readable storage having stored thereon a computer program for performing execution diagnostics with an application executing in a virtual machine, the computer program comprising a routine set of instructions for causing the machine to perform the steps of:

placing the virtual machine in debug mode;

commanding the application based upon instructions in a debug script;

querying the virtual machine through a virtual machine debug interface to identify execution data produced by said commands; and, logging said identified execution data for use in diagnosing operational problems associated with the application.

11. The machine readable storage of claim 10, wherein said execution data comprises data selected from the group consisting of method calls, time delays, call stack data, and data values.

12. The machine readable storage of claim 10, further comprising the step of retrieving said debug script from a remote repository of debug scripts.

13. The machine readable storage of claim 12, wherein said retrieving step comprises the steps of:

specifying a test identifier to said remote repository; and, retrieving a debug script associated with said specified test identifier.

14. The machine readable storage of claim 10, further comprising the step of posting said logged execution data to a remotely positioned technical support server.

* * * * *

UNITED STATES PATENT AND TRADEMARK OFFICE
CERTIFICATE OF CORRECTION

PATENT NO. : 7,644,312 B2 Page 1 of 1
APPLICATION NO. : 10/335276
DATED : January 5, 2010
INVENTOR(S) : Hind et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1929 days.

Signed and Sealed this

Sixteenth Day of November, 2010

David J. Kappos
*Director of the United States Patent and Trademark Office*